Dec. 12, 1967     S. J. JENNINGS     3,357,060
ROTARY COTTON GIN
Filed Sept. 16, 1966
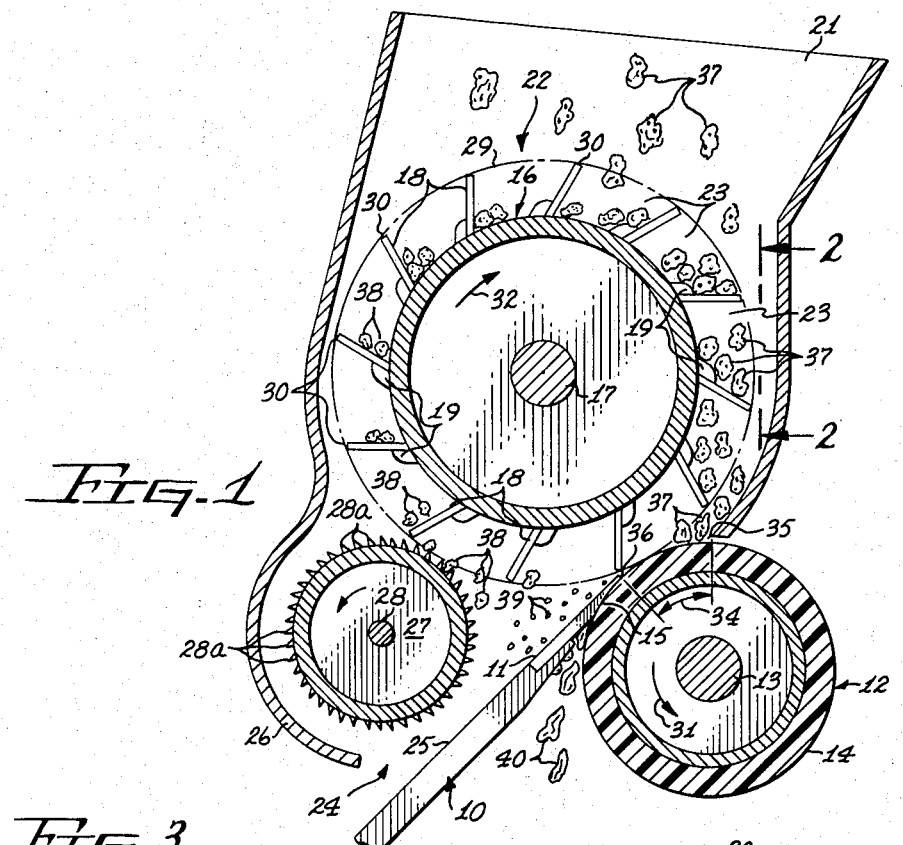
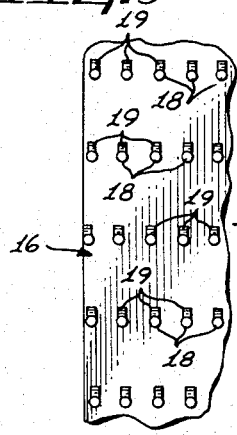
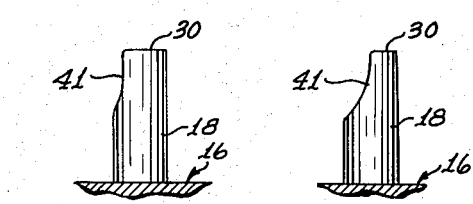
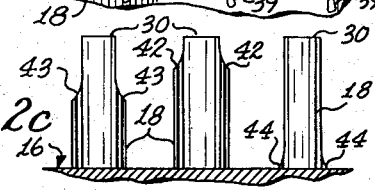
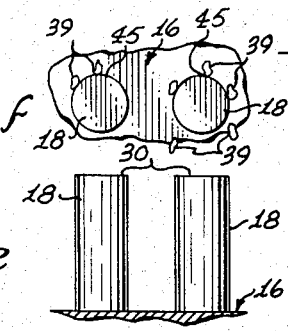
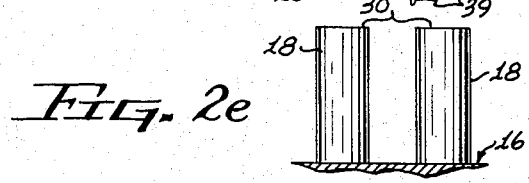
INVENTOR.
SAMUEL J. JENNINGS
BY
Willard S. Groen
ATTORNEY

United States Patent Office

3,357,060
Patented Dec. 12, 1967

3,357,060
ROTARY COTTON GIN
Samuel J. Jennings, Phoenix, Ariz., assignor to Community Gin Company, Scottsdale, Ariz., a partnership
Filed Sept. 16, 1966, Ser. No. 579,903
1 Claim. (Cl. 19—50)

ABSTRACT OF THE DISCLOSURE

A rotary cotton gin with a recovery saw cylinder arranged so that any unginned cotton kicked down with the seed will be picked up by the recovery saw cylinder and carried forward by specially constructed egg-shaped spikes of the feeding and ginning cylinder for subsequent repeated trips over the gin roll and knife.

---

This invention pertains to improvements in a rotary cotton gin and is particularly related to an improved apparatus for introducing cotton to the gin roll.

This invention is related to apparatus such as shown in my earlier Patent 2,933,770 issued Apr. 26, 1960.

One of the objects of this invention is to improve the apparatus for introducing the seed cotton to the gin roll in a rotary cotton gin.

Another object of this invention is to induce the raw cotton to be processed into the spaces between the spikes of a feed cylinder rather than introducing the seed cotton directly on the gin roll of such machines so as to improve the ginning process and provide each lock of seed cotton with a better chance of becoming fully ginned.

Still another object is to provide a spiked feed drum in association with the seed cotton feed hopper and gin roll exposure gap such that the spikes of the drum will vibrate the seed cotton from side to side and then push the seed free during the ginning process instead of a knife tearing the lint free from the seed.

A further object is to provide in a rotary cotton gin a spiked feed and ginning cylinder to initially dislodge the seed from the seed cotton in cooperation with the knife of a rotary cotton gin.

Still another object of this invention is to provide a feed and ginning cylinder with a series of specially constructed spikes providing a maximum of space for the seed cotton to strike the gin roll and arranged so that only a small surface strikes the seed which will move the seed from side to side finally pushing the seed away so as to vibrate the seed to help free the cotton from the lint.

Further features and advantages of this invention will appear from a detailed description of the drawings in which:

FIG. 1 is a diagrammatic cross section through a rotary cotton gin stand incorporating the features of this invention.

FIG. 2 is an outer end view of one of the spikes in the feed and gin cylinder indicated by the line 2—2 of FIG. 1.

FIG. 2a is a side elevation indicated by the line 2a—2a of FIG. 2.

FIG. 2b is a side elevation indicated by the line 2b—2b of FIG. 2.

FIG. 2c is a side elevation of egg-shaped cross-sectioned spikes.

FIG. 2d is an outer end view of the spikes shown in FIG. 2c.

FIG. 2e is a side elevation of cylindrical spikes.

FIG. 2f is an outer end view of the spikes shown in FIG. 2e.

FIG. 3 is a fragmentary stretched out peripheral view showing the spike arrangement of the spiked feed and ginning roll.

As an example of one embodiment of this invention there is shown a gin stand having a breastplate 10 with the stationary knife 11 appropriately fixed to the breastplate 10. The gin roll 12 is mounted on the roll shaft 13 in the frame, not shown, of the gin stand in the usual manner such as shown in Patent 2,903,750. The peripheral surface 14 of the gin roll 12 rotates against the surface 15 of the stationary knife 11 during the operation of the gin.

The rotary spiked feeding and ginning cylinder 16 is suitably mounted on the shaft 17 suitably journaled on the frame, not shown, of the gin stand and has a series of circumferentially spaced spikes 18 rigidly fixed by metal reinforcing strips 19 to the cylinder 16.

Preferably the spikes may be attached in a pattern such as shown in FIG. 3. The spikes 18 may vary in size, shape and transverse cross-section. FIGS. 2, 2a and 2b show a preferred form of spike arrangement indicating the ideal way for the cotton seed 39 to strike the spikes 18 having the angularly disposed surfaces 41. In FIGS. 2c and 2d the cross-section of the spikes is egg-shaped which may extend a short distance down from the spike end as at 42, half way down as at 43, or all the way down as at 44. The spikes ordinarily strike the seed 39 only on the end of each spike. In FIG. 2e the spikes are of plain cylindrical cross-section so that in this arrangement some of the spikes might hit some seed head on as can be noted at 45 in FIGS. 2d and 2f which shows the difference in the two types of spikes striking the seed, all spikes pushing the seed to the side the same distance if spikes are of the same size.

A raw seed cotton feed chute 21 has a discharge opening at 22 directly adjacent the spiked cylinder 16 for directly depositing the raw seed cotton against the spikes 18 to be received in the spaces 23 between the spikes. A seed chute 24 is formed between the face 25 of the breastplate 10 and the arcuate baffle 26 suitably fixed to the gin stand frame.

A recovery saw cylinder 27 is journaled on a shaft 28 suitably journaled in the gin stand frame and located within the seed chute 24. A series of suitable saw teeth 28a are provided on the periphery of the recovery saw cylinder 27 having their outer ends arranged in close proximity to the peripheral path of travel 29 of the outer tips 30 of the spikes 18 of the feeding and ginning cylinder 16.

In operation: the gin roll 12 is revolved in a counter-clockwise direction as indicated by the arrow 31 while the spiked feeding and ginning cylinder 16 revolves in a clockwise direction indicated by the arrow 32. The peripheral speed of the tips 30 of the spikes 18 is slightly greater than the peripheral speed of the surface 14 of the gin roll 12 so the tips 30 of the spikes 18 relatively travel across the surface 14 of the gin roll 12 and across the exposure gap 34 from the guide plate trailing edge 35 to the edge 36 of the stationary knife 11 feeding and spreading the raw cotton over the gin roll surface 14. Under these conditions the spikes 18 of the cylinder 16 will vibrate the seed cotton 37 from side to side, then push the seed free during the ginning process. Any unginned cotton 38 that is kicked down with the seed will be picked up by the saw cylinder 27 and carried forward with the spikes 18 for another trip back over the gin roll 12 as described until it is finally removed as the cotton lint 40. Thus, instead of a knife 11 tearing the lint 40 free from the seed 39, the spikes 18 do the same in a better and more efficient manner.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim are intended to be included herein.

Having thus fully set forth and described this invention what is claimed and desired to be obtained by United States Letters Patent is:

A rotary cotton gin comprising in combination:
(A) a stationary knife,
(B) a rotatable gin roll engaging said knife,
(C) a rotary spiked feeding and ginning cylinder,
(D) a series of circumferentially spaced spikes having raw cotton receiving spaces between said spikes fixed in the periphery of said feeding and ginning cylinder,
(E) a raw cotton feed chute having a discharge opening adjacent the periphery of said feeding and ginning cylinder,
(F) a seed chute adjacent said stationary knife having arranged to receive the ginned seed from said spaces between said spikes of said feeding and ginning cylinder,
(G) a recovery saw cylinder having peripheral saw teeth adjacent the peripheral path of travel of the tips of said spikes of said feeding and ginning cylinder located adjacent said seed chute,
(H) and circumferentially spaced spikes having an egg-shaped transverse cross-section with the small end of said egg-shape pointing in the direction of rotation of said rotary spiked feeding and ginning cylinder.

References Cited
UNITED STATES PATENTS

| | | | |
|---|---|---|---|
| 923,533 | 6/1909 | Kent | 19—53 |
| 1,280,863 | 10/1918 | Saunders | 19—50 |
| 1,707,131 | 3/1929 | Mitchell | 19—56 |
| 1,770,544 | 7/1930 | Mitchell | 19—56 |
| 2,973,559 | 3/1961 | O'Neal | 19—50 |
| 3,145,424 | 8/1964 | Bledsoe | 19—52 |
| 3,251,094 | 5/1966 | Vandergriff | 19—50 |

MERVIN STEIN, *Primary Examiner.*
I. C. WADDEY, *Assistant Examiner.*